(12) United States Patent
Bond (10) Patent No.: US 7,101,066 B2
(45) Date of Patent: Sep. 5, 2006

(54) AUTOMATIC ON, OFF, AND RECHARGING VEHICLE WHEEL LIGHTING DEVICE

(75) Inventor: Michael Norman Bond, Welland (CA)

(73) Assignee: Michael N. Bond, Welland (CA)

( * ) Notice: Subject to any disclaimer, the term of this patent is extended or adjusted under 35 U.S.C. 154(b) by 74 days.

(21) Appl. No.: 10/972,905

(22) Filed: Oct. 26, 2004

(65) Prior Publication Data

US 2006/0087859 A1    Apr. 27, 2006

(51) Int. Cl.
    *B60Q 2/00* (2006.01)
    *F21V 21/00* (2006.01)
(52) U.S. Cl. ............... 362/500; 362/464; 362/183; 362/192; 362/545
(58) Field of Classification Search ........... 362/500, 362/464, 183, 192, 545
    See application file for complete search history.

(56) References Cited

U.S. PATENT DOCUMENTS

| | | | |
|---|---|---|---|
| 4,725,928 A | 2/1988 | Strepak | |
| 4,763,230 A | 8/1988 | Cumming | |
| 4,782,431 A | 11/1988 | Park | |
| 5,016,144 A | 5/1991 | DiMaggio | |
| 5,357,238 A | 10/1994 | Terada | |
| 5,683,164 A | 11/1997 | Chien | |
| 6,059,431 A | 5/2000 | Ellis, Jr. | |
| 6,116,762 A | 9/2000 | Kutlucinar | |
| 6,116,763 A | 9/2000 | King | |
| 6,220,733 B1 | 4/2001 | Gordon | |
| 6,565,243 B1 | 5/2003 | Cheung | |
| 6,572,251 B1 | 6/2003 | Huang | |
| 6,601,979 B1 | 8/2003 | Byrd | |
| 6,612,726 B1 | 9/2003 | Goodt | |
| 6,644,839 B1 | 11/2003 | Lee | |
| 6,742,913 B1 | 6/2004 | Deutsch | |
| 6,962,427 B1 * | 11/2005 | Gloodt et al. | 362/500 |
| 2004/0130905 A1 * | 7/2004 | Olds et al. | 362/487 |
| 2005/0099820 A1 * | 5/2005 | Cooper | 362/500 |
| 2006/0044817 A1 * | 3/2006 | Terry | 362/500 |

* cited by examiner

*Primary Examiner*—Thomas M. Sember (57) ABSTRACT

A new wheel lighting device which operates in either an "ON" mode or a "RECHARGE" mode. In the "ON" mode rechargeable batteries mounted on a vehicles wheel supply power to LED's which illuminate a vehicles wheel, and the device is independent of the vehicles electrical system. In the "RECHARGE" mode the device is electrically connected, by means of a retractable connector and insulated conductive ring, to the vehicles fully charged battery, (when the vehicle engine is no longer in motion), and uses that battery to recharge the rechargeable batteries on the wheel. While this is happening the LED's are reverse biased to the current and are off, and a now forward biased diode allows the recharging. A voltage regulator is used to convert the voltage of the vehicles battery to a suitable voltage of the rechargeable batteries. Once the rechargeable batteries are disconnected from the vehicles electrical system, as when the vehicle is started, the device returns to the "ON" mode.

24 Claims, 9 Drawing Sheets

AUTOMATIC ON, OFF, AND RECHARGING VEHICLE WHEEL LIGHTING DEVICE

CROSS-REFERENCE TO RELATED APPLICATIONS

Not Applicable

STATEMENT REGARDING FEDERALLY SPONSORED RESEARCH AND DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to providing decorative lighting to vehicle wheels. Specifically, the present invention sets forth a new, useful, and practical application of wheel lighting using rechargeable batteries which are automatically recharged using the vehicles existing power supply, and lights which automatically turn on when the vehicle starts, and off when the vehicle is shut off.

Automobile makers offer, more or less, mass-produced generic vehicles because in this way they are able to make, and sell them cheaper. Of course, everyone is different and wants to be unique, so manufacturers profit off this by offering accessories to customize the vehicles to a particular customers preference. One field of these accessories is lighting, and while it is relatively easy to attach a stationary light to the vehicles stationary battery and body, it is quite difficult to attach lights on the rotating and exposed wheels of the vehicle. While several attempts have been made, they all falter in practicality and consumer desirability.

One such example is the solution provided in U.S. Pat. No. 6,601,979 to Byrd who describes attaching insulated conductive bands to the inside of a wheel and allowing current to flow from the vehicles battery to the bands by contact with electrical brushes. This cumulator is the acting means of electrical motors and works well in that application, but on wheels it falls short for several reasons. Number one is the surface speed contact between the brushes and the bands. In an electrical motor the bands and brushes are placed as close to the centre of the spinning axis as possible to reduce the surface speed, and are also covered to prevent foreign elements from destroying the contacts. Byrd's system has none of these qualities and because the wheels are exposed to constant dirt, high temperatures, and high surface speeds, system failure is certain. Also, the inventor does not take into account the usual need for tire changes and how inconvenient and difficult it becomes with a solid brush holder that must be precisely positioned to operate. There is also the certainty of failure from short circuits caused by water mixed with salts that conduct electricity across the brushes and bands.

Other solutions described by U.S. Pat. No. 6,612,726 to Goodt and U.S. Pat. No. 6,644,839 to Lee describes lights affixed to the body of the vehicle, which shine thru the openings in the rotating wheels. Neither solution is practical, though, as dirt, brake dust, and grime soon covers the lights rendering them unfunctional. Also, because of the proximity to the heat from the brakes that the lights are exposed to, they can actually melt or catch on fire.

U.S. Pat. No. 4,725,928 to Strepak, U.S. Pat. No. 4,728,431 to Park, and U.S. Pat. No. 6,116,763 to King all describe another typical solution to the problem in which they convert the rotational energy of the moving vehicle wheel to the electrical energy, which powers the lights by means of a generator. These systems are all bulky and complicated mechanisms, which rely on the motion of the vehicle for light. Since the vehicle stops frequently, and the lights shut off, there is a detrimental effect to the overall desired effect.

U.S. Pat. No. 4,763,230 to Cummins, U.S. Pat. No. 5,016,144 to DiMaggio, U.S. Pat. No. 6,059,431 to Ellis. Jr., U.S. Pat. No. 6,220,733 to Gordon, U.S. Pat. No. 6,565,243 to Cheung, U.S. Pat. No. 6,742,913 to Deutsch, U.S. Pat. No. 5,683,164 to Chien, and U.S. Pat. No. 6,572,251 to Huang all describes battery powered lighting systems for wheels. A major downfall of these devices is the dying of the batteries, and while it is easy to imagine them with rechargeable batteries, the batteries would still have to be manually replaced. Many also require manual switching "on" of the devices, while others require motion sensors for activation and do not function on a stationary vehicle.

U.S. Pat. No. 5,357,238 to Terada describes a solar cell that is attached to the outside of the wheel to catch sunlight in order to recharge the batteries. Unfortunately, because solar cells produce very little energy unless they have a great surface area, this is impractical. Solar cells only work well when facing the sun or other light source. Being attached to the wheel, they are parallel to the suns rays and ineffective. Solar cells are also quite expensive and fragile which would be of great concern to a consumer considering that they are attached to the wheels, which are made durable because of the harsh conditions that they encounter.

U.S. Pat. No. 6,116,762 to Kutlucinar sums up all the problems of the battery-operated systems. Most notable is that it describes a kit, which comes with a portable recharger to recharge one set of batteries while the user uses another set until they are dead. One must assume that the user would have to change the batteries every couple of days. Also, this system only works while the vehicle is in motion.

The present inventor understands that the common consumer desires devices that are automatic. They do not wish to switch on the wheel lights before they travel. They do not wish to switch the lights off at the end of their trips. They do not wish to perform maintenance every couple of days. In regards to a wheel lighting device, they want to get in their car and start the engine and have the lights turn on. They want to shut their cars off and have the lights switch off as well. While, because rechargeable batteries cannot be recharged infinitely, and the present invention relies on rechargeable batteries, it also needs maintenance like other devices, those devices produce a small amount of light on the magnitude of hours before servicing, while the present invention produces a large amount of light on the magnitude of years before servicing.

Another feature of the present invention is its ease of installation and universal application to all existing and future vehicles.

SUMMARY OF THE INVENTION

Accordingly, it is an object of the present invention to provide a wheel lighting device for vehicle wheels, which is installable by the average driver.

It is an additional object of the present invention to provide an automatically activated, deactivated, and recharging wheel lighting device for vehicle wheels.

It is also an object to provide a virtually maintenance free wheel lighting device which requires very little modification of a vehicle and is universally applicable.

It is yet further an object to provide a wheel lighting device, which accents original stock production vehicle wheels.

It is also an object to provide wheels produced with the wheel lighting device to add decorative wheel lighting, which matches custom paint jobs.

DETAILED DESCRIPTION OF THE INVENTION

Figure 1:
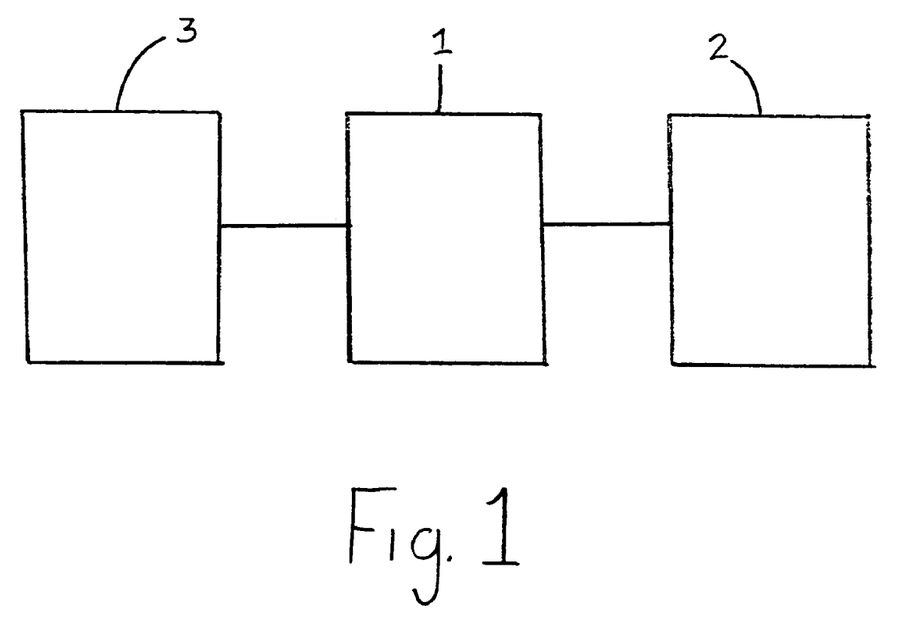
FIG. 1 is a block view of the components of the device.

FIG. 1 is a block view of the invention which shows the stationary battery (3) of the vehicle, which is constantly being recharged by the charging system of the vehicle, electrically connected to the wheel lighting device (2) by a retractable connector (1). Basically, the invention has two forms of operation. In one form the wheel lighting device (2) is connected to the vehicles battery (3) and the wheel lighting device (2) produces no light and is being recharged. In the other form of operation the wheel lighting device (2) is disconnected from the vehicles battery (3) at the retractable connector (1) and the wheel lighting device (2) produces light to illuminate the wheel (12).

Figure 2:
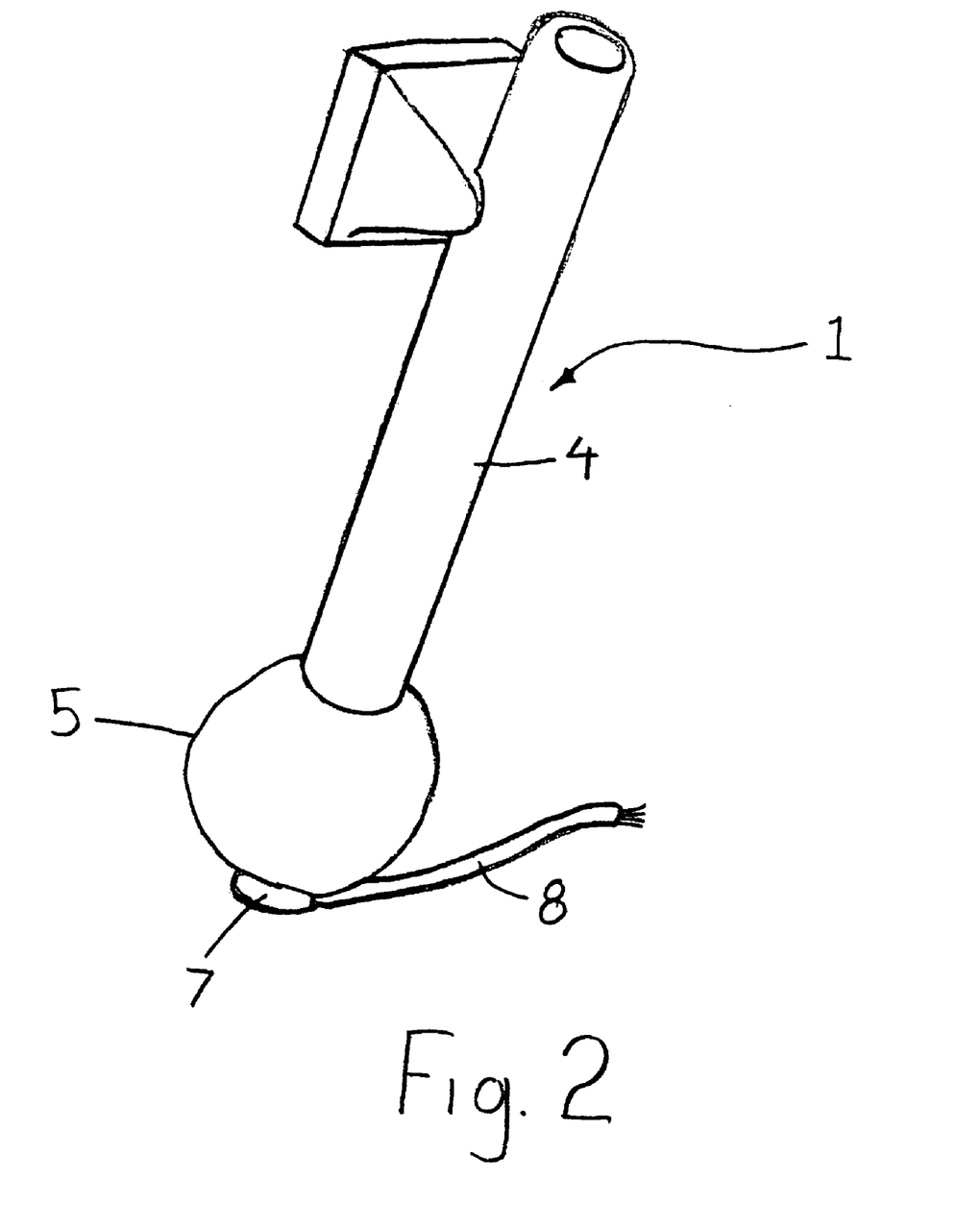
FIG. 2 is an isometric view of the retractable connector.

FIG. 2 shows an isometric view of the preferred embodiment of the retractable connector (1), which is operated by using the vacuum produced from the running engine of the vehicle. The retracting means can certainly be accomplished in different ways, but by using the available vacuum the device may be made especially light and, therefore, does not need an especially solid means of affixing it to the vehicle. This helps in making the entire invention easy to install as the retractable connector (1) can be glued at any number of places, which can be done by most anyone.

Figure 3:
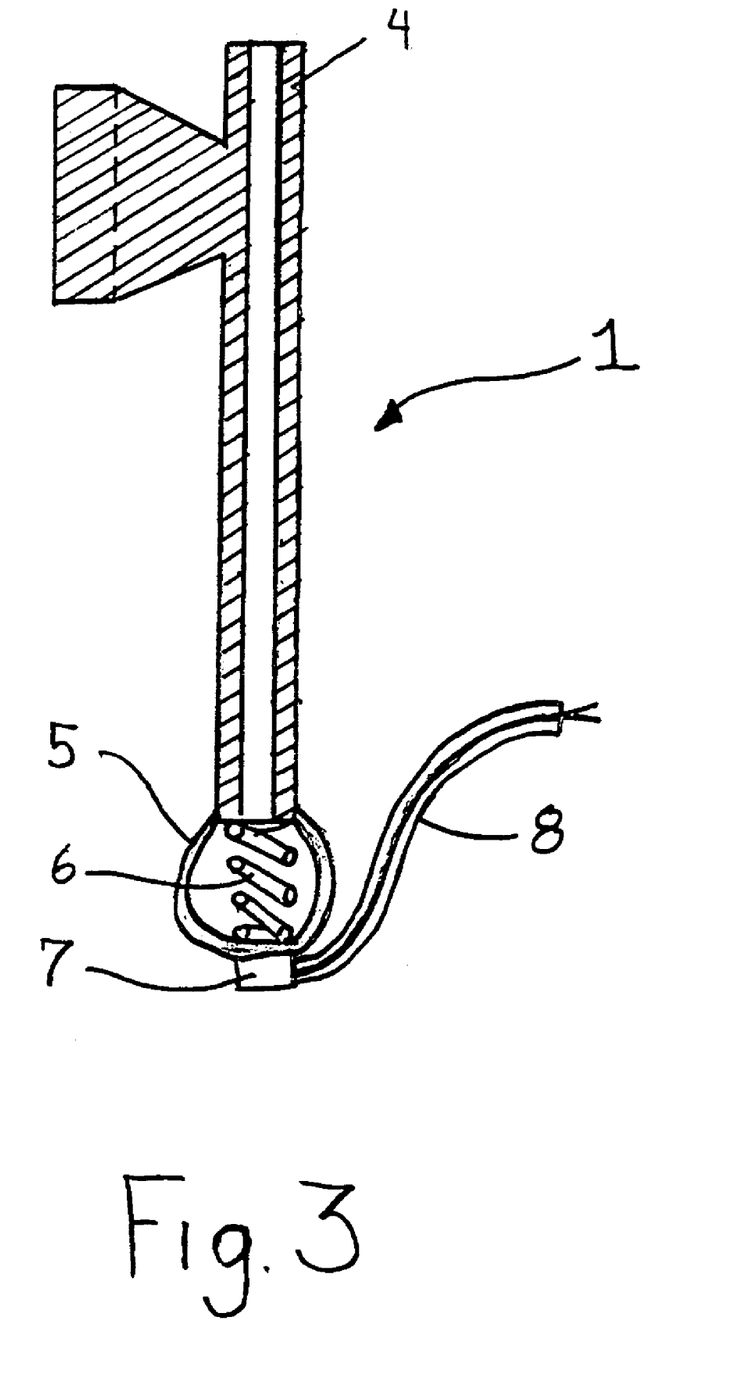
FIG. 3 is a sectional cross view of the retractable connector.

Referring to FIG. 3 we see a sectional cross-section of the retractable connector (1). The metal tube (4) would typically have a mounting surface as part of its form, and would be attached to a non-rotating, stationary, and convenient part of the vehicle. The spring (6) is used to produce a small pressure on the electrical connector (7) and holds it in place. When a vacuum is applied to the open end of the metal tube (4) the rubber diaphragm (5) is evacuated and outside air pressure collapses the rubber diaphragm (5) and the spring (6) inside. This accomplishes the disconnection of the vehicles battery (3) from the wheel lighting device (2). When the vacuum ceases, as when the vehicles engine is no longer running, the spring (6) expands the rubber diaphragm (5). This accomplishes reconnection of the vehicles battery (3) to the wheel lighting device (2).

Figure 4:
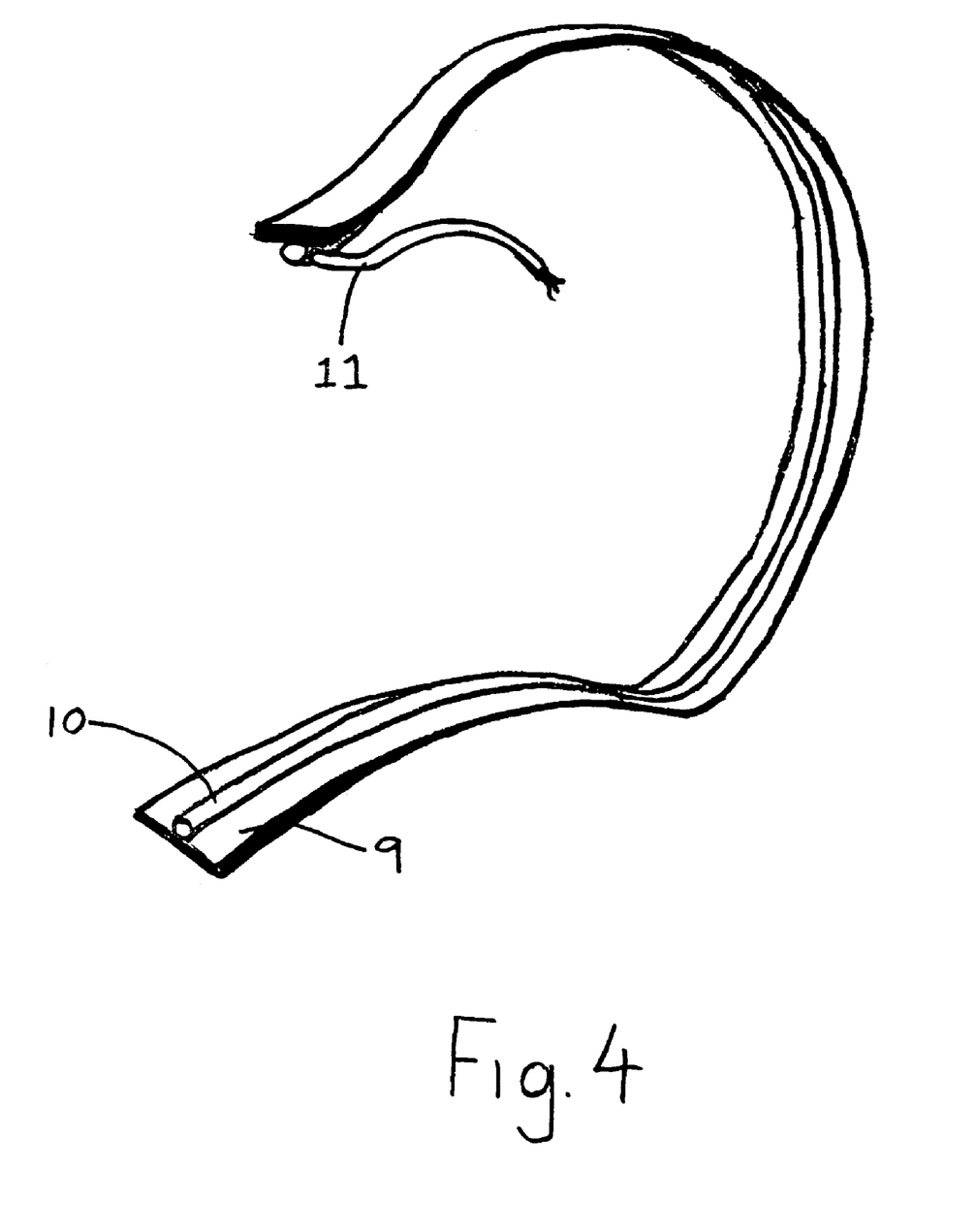
FIG. 4 is an isometric view of the insulating material, conductive ring, and insulated wire assembly

FIG. 4 is an isometric view showing the conductive ring (10) attached to the insulating material (9) and is depicted so that it may be seen that the combination is extremely flexible. This combination can, in the preferred embodiment of the invention, be made as one unit. One long stretch could be manufactured and cut so that it will fit in innumerable positions, and on any wheel.

Figure 5:
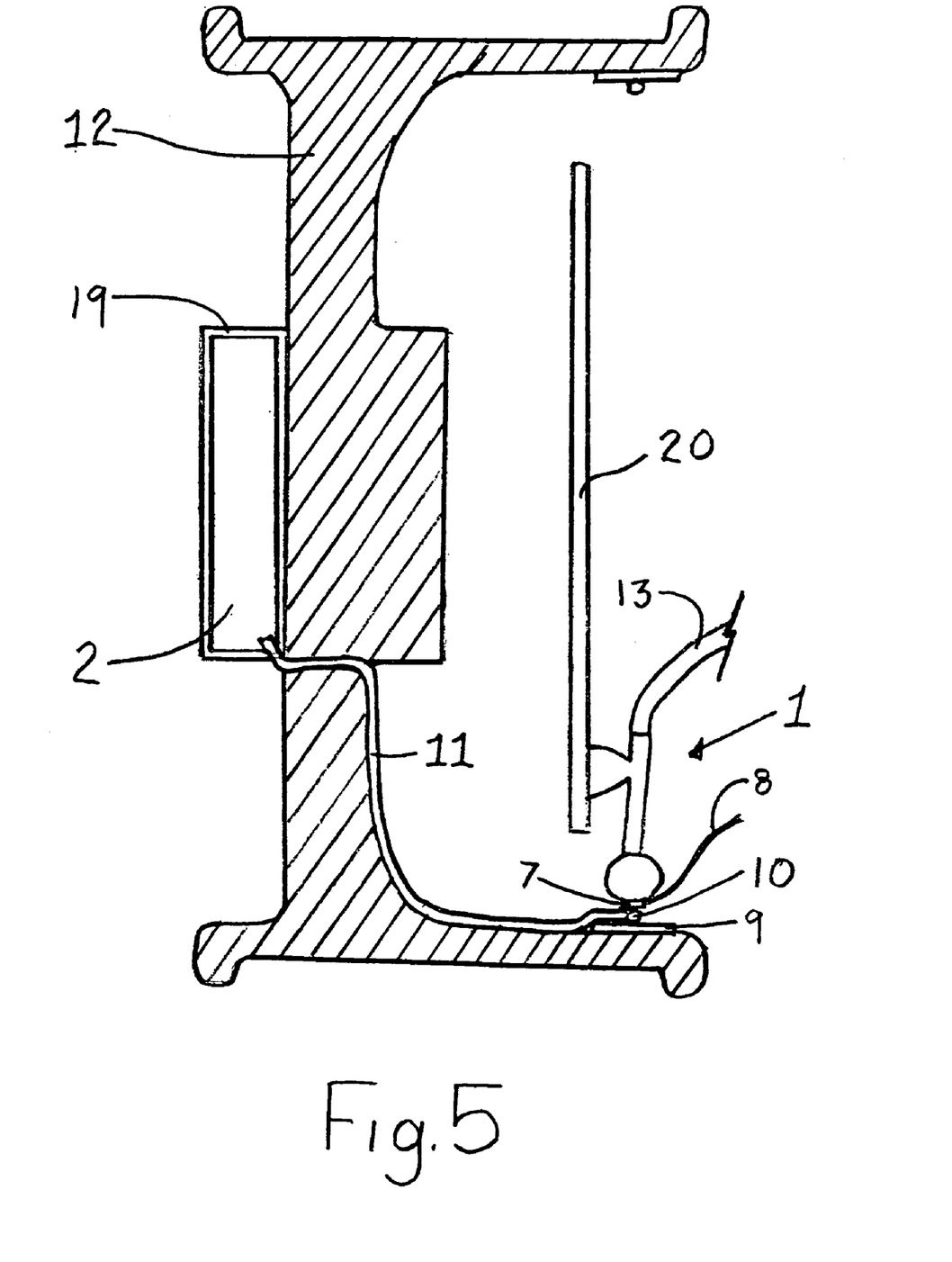
FIG. 5 is a sectional cross view of the typical embodiment attached to a wheel.

FIG. 5 shows a cross sectional view of a typical installation of the invention. On the inner side of the wheel (12) the insulating material (9) and conductive ring (10) are affixed so that the conductive ring (10) is electrically insulated from the wheel (12), which is grounded electrically to the vehicles battery (3) by the metal-to-metal contacts of the bearing, bolts, and brackets. The insulating material (9) would typically be glued onto the wheel (12) and would be placed in a convenient position so that the retractable connector (1) can be affixed to the backing plate (20) and made to make contact of the electrical connector (7) to the conductive ring (10). In the charging mode, as shown, there is no vacuum received from the vehicles engine (14) by the rubber hose (13) and, therefore, electrical current can pass thru the insulated wire (8) to the electrical connector (7), the conductive ring (10) and insulated wire (11) to the wheel lighting device (2). While there are typically holes which are part of a typical wheel (12) by which the insulated wire (11) could be passed to the wheel lighting device (2), a hole could be drilled, or a wheel could be manufactured with such a hole. Surrounding the wheel lighting device (2) would typically be a protective transparent cover (19), which would be affixed to the wheel. As the means of affixing covers to wheels are too numerous to innumerate, and not part of the present invention, I will not elaborate on the means for affixing the protective transparent cover (19), to the wheel (12).

Figure 6A:
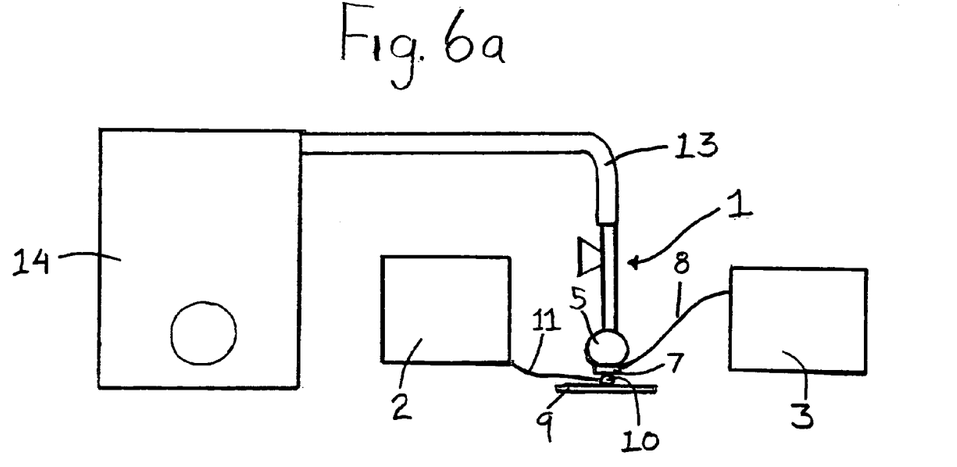
FIG. 6A is a block view depicting the device in the CHARGING mode.

FIG. 6A is a block diagram depicting the wheel lighting device (2) in the charging mode. The vehicles engine (14) is shown in its non-operating function and does not create a vacuum in the rubber hose (13) so that the retractable connector (1) allows a circuit to be maintained from the vehicles battery (3) via the insulated wire (8), electrical connector (7), conductive ring (10), and insulated wire (11), to the wheel lighting device (2).

Figure 6B:
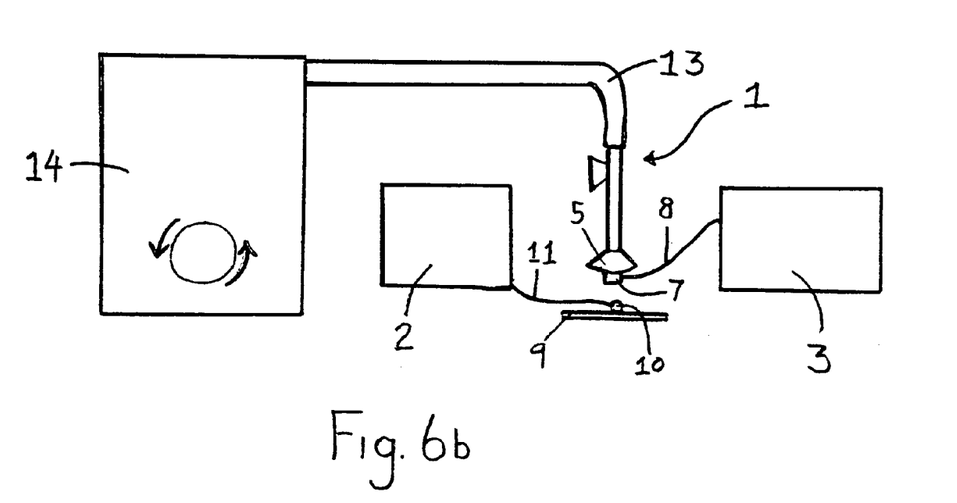
FIG. 6B is a block view depicting the device in the ON mode

In FIG. 6B the vehicles engine (14) is operating and creating a vacuum, which, via the rubber hose (13) collapses the rubber diaphragm (5) which disconnects the electrical connector (7) from the conductive ring (10) thereby isolating the vehicles battery (3) from the wheel lighting device (2). The wheel lighting device (2) is now in the "ON" mode and illuminates.

Figure 7:
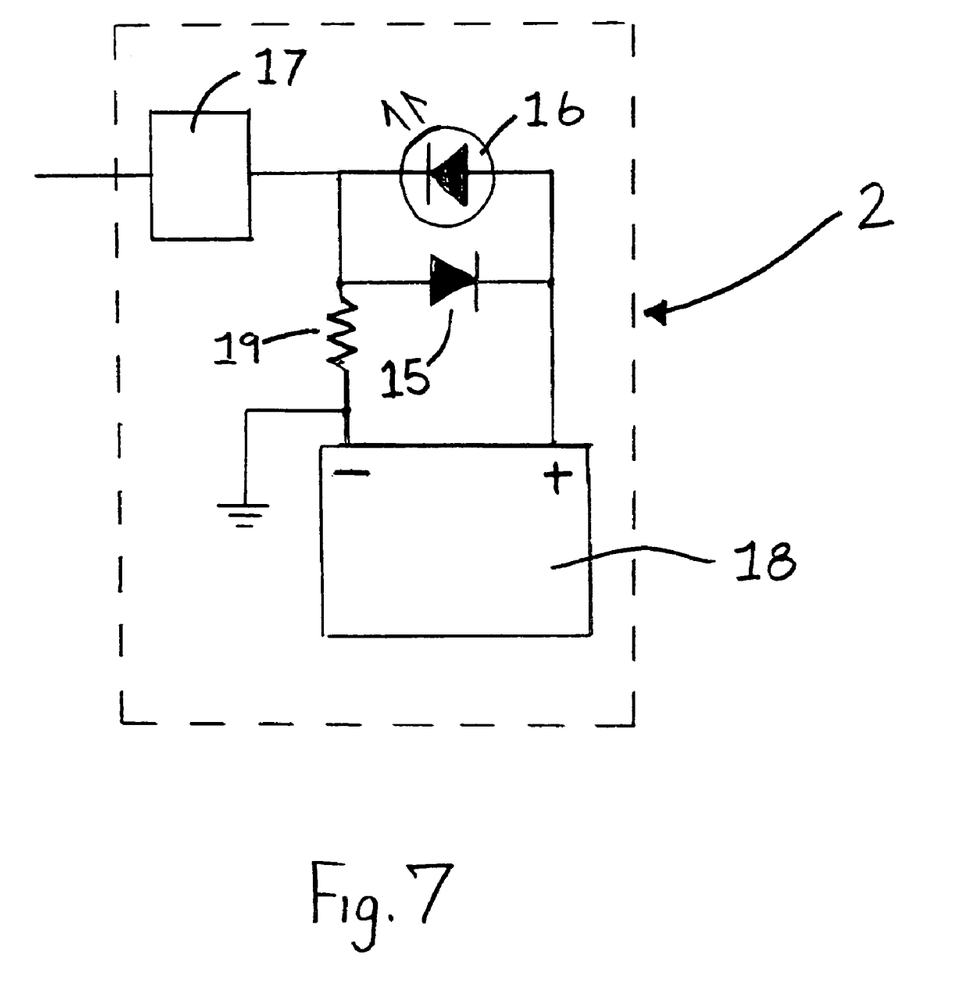
FIG. 7 is a block view of the typical embodiment of the lighting unit.

FIG. 7 is a block diagram of the internal circuitry of the wheel lighting device (2). In the "ON" mode electrons flow from the negative terminal of the rechargeable battery pack (18) thru the resistor (19), which reduces the voltage, and then the electrons flow thru the forward biased light emitting diode (16), and then back to the positive terminal of the rechargeable battery pack (18). Since no electrons are being introduced to the voltage regulator (17) it does not affect the circuit, and the diode (15) is reverse biased to the current flow and does not allow current to flow across it. In the "CHARGE" mode voltage is introduce to the voltage regulator (17) which regulates the electron flow such that the light emitting diode (16) is now reverse biased to the flow and does not allow electrons to flow across it, and does not illuminate. However, the diode (15) is now forward biased to the electron flow and allows electrons to flow thru it, which recharges the rechargeable battery pack (18).

Figure 8:
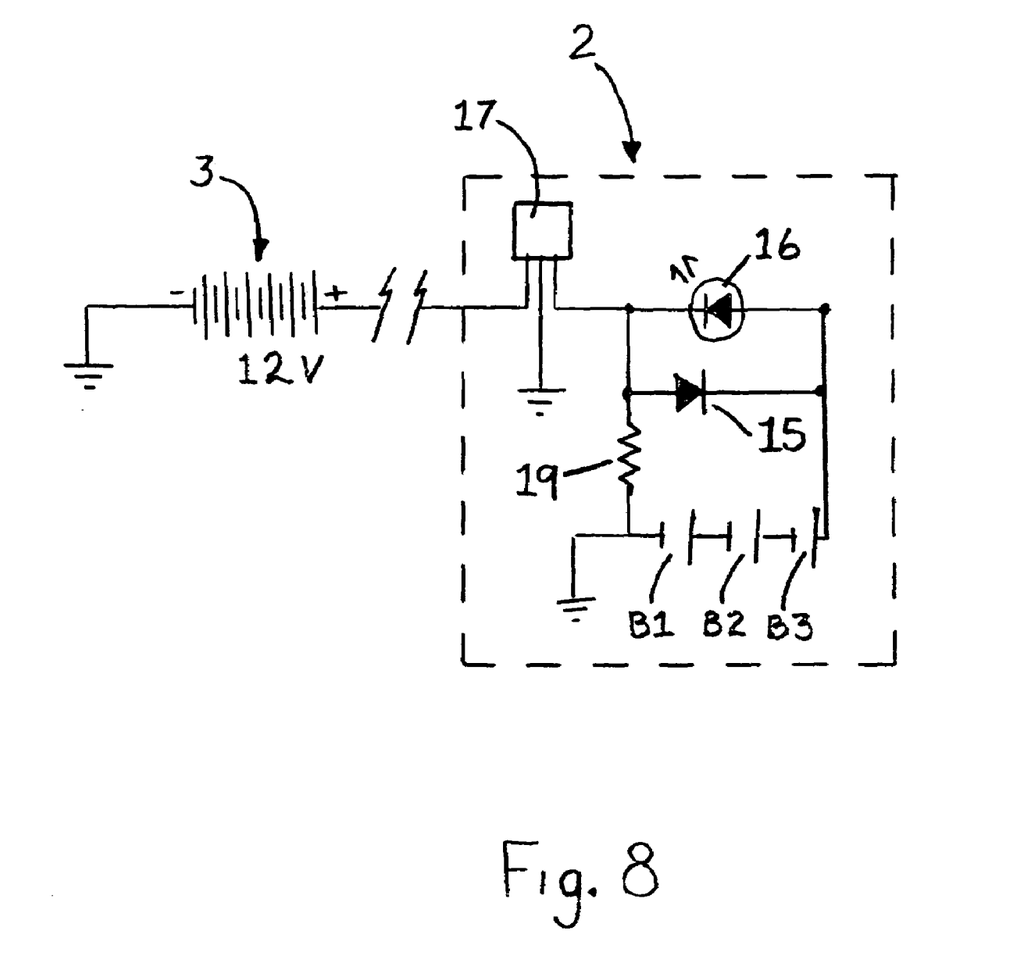
FIG. 8 is a detailed circuit diagram of the preferred embodiment of the lighting unit.

FIG. 8 is a detailed circuit diagram of the internal circuitry of the preferred embodiment of the wheel lighting device (2). The rechargeable batteries (B1), (B2), and (B3) are connected in series and, with typical Nickel-Metal Hydride batteries, have a combined voltage of between 3.6 volts to 4.5 volts when fully charged. When 12 volts from the vehicles battery (3) is put across the voltage regulator (17), which would typically be a I.C.7805 positive, a regulated current at 5 volts is initiated. As the light emitting diode (16) is now reverse biased to the electron flow, no electrons are allowed to flow across it and it does not illuminate. However, the diode (15) is now in a forward biased position to the electron flow and allows electrons to pass. The diode (15) also drops the voltage in the circuit, usually by 0.6 volts for the typical silicon diode, which leaves a regulated circuit at 4.4 volts across the rechargeable batteries (B1), (B2), and (B3). The batteries are now being recharged by the vehicles battery (3) up to the maximum voltage of 4.4 volts, at which point the electrons will stop flowing. All the time the batteries are recharging the lights stay off. Although the circuit diagram only shows one light emitting diode (16) it should be obvious to anyone skilled in the art that many more light emitting diodes (16) could be entered in parallel with the first to provide greater lighting. Similarly, it should be obvious that only the current flow from the vehicles battery (3) needs to be interrupted for the wheel lighting device (2) to go into the "ON" mode. This could be easily accomplished with a switch between the vehicles battery (3) and the retractable connector (1).

Figure 9:
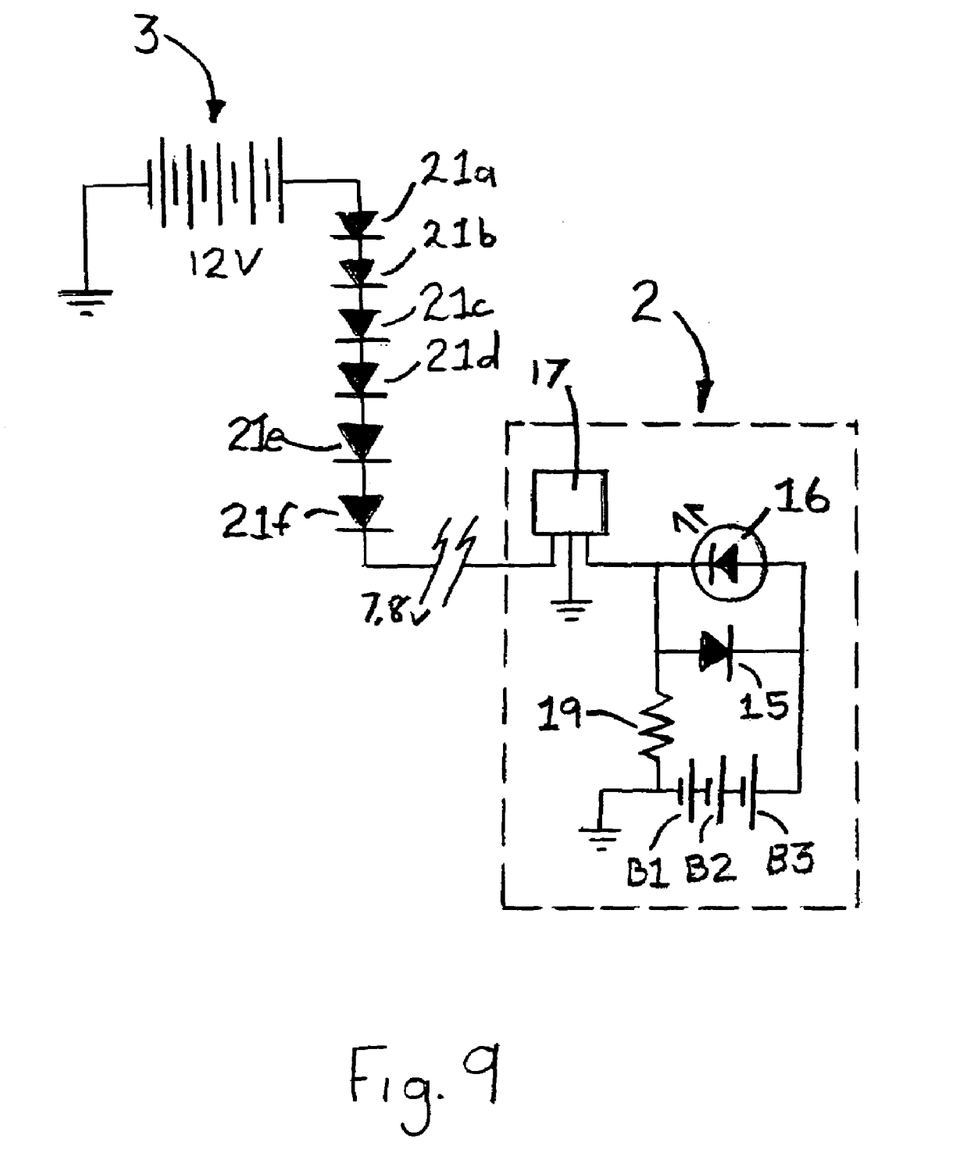
FIG. 9 is a detailed circuit diagram of the preferred embodiment of the lighting unit.

FIG. 9 is the same as FIG. 8 except for the addition of diodes (21*a*), (21*b*), (21*c*), (21*d*), (21*e*), and (21*f*). This drops the voltage at the input of the voltage regulator (17) to about 7.8 volts and is done to limit power consumption (and loss) in the voltage regulator (17).

What is claimed is:

1. An automatic on, off, and recharging vehicle wheel illumination device comprising:
    a wheel;
    a stationary vehicle battery;
    a protective transparent cover having means for affixing said protective transparent cover to said wheel;
    a rechargeable battery pack with a negative terminal electrically connected to said wheel and having means for affixing said rechargeable battery pack to said protective transparent cover;
    a diode with a cathode lead electrically connected to a positive terminal of said rechargeable battery pack;
    a resistor electrically connected between the negative terminal of said battery pack and the anode lead of said diode;
    a light emitting diode with a anode lead electrically connected with the cathode lead of said diode and a cathode lead electrically connected to the anode lead of said diode;
    a positive voltage regulator with a regulated positive current lead electrically connected to the anode lead of said diode and a ground lead electrically connected to said wheel;
    an electrical insulating material with means for affixing said electrical insulating material to said wheel;
    a conductive ring electrically connected with means for affixing said conductive ring to said positive voltage regulator at a lead and having means for affixing said electrical insulating material such that it is electrically insulated from said wheel;
    a retractable connector with means for affixing said retractable connector to a non-rotational platform of a vehicle and having a means for retracting;
    an electrical connector affixed to said retractable connector and electrically connected to a positive terminal of said stationary vehicle battery.

2. An automatic on, off, and recharging vehicle wheel illumination device of claim 1 wherein a plurality of light emitting diodes are electrically connected with the anode leads electrically connected to the cathode lead of said diode and the cathode leads electrically connected to the anode lead of said diode.

3. An automatic on, off, and recharging vehicle wheel illumination device of claim 1 wherein the positive voltage regulator is a I.C.7805 5 volt voltage regulator.

4. An automatic on, off, and recharging vehicle wheel illumination device of claim 1 wherein the rechargeable batter pack consists of three Nickel Metal Hydride batteries electrically connected in series.

5. An automatic on, off, and recharging vehicle wheel illumination device of claim 1 wherein the means for affixing said retractable connector to said non-rotational platform of a vehicle is accomplished with an adhesive.

6. An automatic on, off, and recharging vehicle wheel illumination device of claim 1 wherein the means for affixing said retractable connector to said non-rotational platform of the vehicle is accomplished with rivets.

7. An automatic on, off, and recharging vehicle wheel illumination device of claim 1 wherein the means for retracting said retractable connector is accomplished using a vacuum.

8. An automatic on, off, and recharging vehicle wheel illumination device of claim 1 wherein the positive voltage regulator is a I.C.7806 6 Volt voltage regulator and the rechargeable battery pack consists of 4 Nickel Metal Hydride batteries electrically connected in series.

9. An automatic on, off, and recharging vehicle wheel illumination device of claim 1 wherein the means for retracting said retractable connector is accomplished using an electrically activated solenoid.

10. An automatic on, off, and recharging vehicle wheel illumination device of claim 1 further comprising six silicon diodes electrically connected in series with the end anode lead electrically connected to said conductive ring, and the cathode lead electrically connected to said voltage regulator.

11. An automatic on, off, and recharging vehicle wheel illumination device of claim 1 wherein further comprising an automatic vehicles battery guard device electrically connected to the positive terminal of a vehicle's stationary battery and having a means for shutting off and disconnecting the vehicles stationary battery from said electrical connector if the voltage drops below a preset voltage.

12. A vehicle wheel lighting device comprising:
    a hubcap with means for affixing said hubcap to a vehicle's wheel and having means of illumination, a rechargeable power source, a means for recharging said rechargeable power source, and a means for switching to shut off the means of illumination when recharging said rechargeable power source;
    an insulating material with means for affixing said insulating material to the inner side of a vehicle's wheel;

a conductive ring affixed to said insulating material such that it is insulated from a vehicle's wheel and is electrically connected to said rechargeable power source of said hubcap;

a retractable connector with means for retracting, a means for affixing to a non rotational platform of a vehicle, and means for electrically connecting a vehicle's stationary positive battery terminal to said conductive ring, and a voltage regulator with means for regulating the voltage of said vehicle's stationary battery such that it is compatible with the voltage of said rechargeable power source of the said hubcap.

13. A vehicle wheel lighting device of claim 12 wherein the means for illumination is accomplished using a plurality of light emitting diodes electrically connected in parallel with the cathode leads electrically connected to a resistor which is electrically connected to the negative terminal of said rechargeable power source, and the anode leads are electrically connected to the positive terminal of said rechargeable power source.

14. A vehicle wheel lighting device of claim 12 wherein the means for switching is accomplished using a diode with its cathode lead electrically connected to the anode leads of the said light emitting diodes, and its anode lead electrically connected to the cathode leads of the said light emitting diodes.

15. A vehicle wheel lighting device of claim 12 wherein the means for recharging is accomplished by the electrical connection of the vehicle's stationary battery to said voltage regulator, and the regulated voltage, from said voltage regulator, to the anode lead of said diode.

16. A vehicle wheel lighting device of claim 12 wherein the means for affixing of said insulating material to the inner side of a vehicle's wheel is accomplished using an adhesive.

17. A vehicle wheel lighting device of claim 12 wherein the means for electrically connecting a vehicle's stationary battery to said conductive ring is accomplished using an electrical connector affixed to the retracting part of said retractable connector such that said retractable connector being affixed to a non-rotational platform of a vehicle allows the contact of said electrical connector with said conductive ring, and said electrical connector is electrically insulated from the vehicle's ground, and is electrically connected to the positive terminal of the vehicle's stationary battery.

18. A vehicle wheel lighting device of claim 12 wherein the means for affixing said retractable connector to a non-rotational platform of a vehicle is accomplished using an adhesive.

19. A vehicle wheel lighting device of claim 12 wherein the means for affixing said retractable connector to a non-rotational platform of a vehicle is accomplished using rivets.

20. A wheel lighting device of claim 12 wherein the rechargeable power source of said hubcap consists of three Nickel Metal Hydride batteries electrically connected in series.

21. A wheel lighting device of claim 12 wherein the voltage regulator is an I.C. 7805 5 volt positive voltage regulator.

22. A wheel lighting device of claim 12 further comprising six silicon diodes electrically connected in series and electrically connected between the positive terminal of a vehicle's stationary battery and the input of said voltage regulator such that the anode lead end of said diodes is electrically connected to the positive terminal of the vehicle's stationary battery, and the cathode lead end is electrically connected to the input of said voltage regulator.

23. A wheel lighting device of claim 12 further comprising a battery guard electrically connected to the positive terminal of a vehicle's stationary battery and having a means for disconnecting the vehicle's stationary battery from said electrical connector if the voltage drops below a preset voltage.

24. A wheel lighting device of claim 12 further comprising a switch electrically positioned between the vehicle's stationary battery and said electrical connector being able to stop the electron flow to the vehicle's stationary battery.

* * * * *